Patented June 23, 1953

2,643,246

UNITED STATES PATENT OFFICE 2,643,246

WATER-SOLUBLE COPOLYMERS OF SALTS OF MONOALKYL ESTERS OF MALEIC ACID

Wilfred K. Wilson, Springfield, Mass., assignor to Shawinigan Resins Corporation, Springfield, Mass., a corporation of Massachusetts No Drawing. Application May 29, 1951, Serial No. 228,969

9 Claims. (Cl. 260—78.5)

This invention relates to water-soluble copolymers of vinyl esters with salts of monoalkyl esters of maleic acid and processes of producing the same.

The number of water-soluble synthetic resins is very small when compared to the large number of water-insoluble resins. Certain of the hydrolyzed polyvinyl esters, some copolymers containing crotonic acid, or other unsaturated organic acids are outstanding types of water-soluble synthetic resins.

The copolymers of vinyl esters with maleic anhydride are also known. In U. S. P. 2,486,455, for example, a bead polymerization process is disclosed in which the heteropolymer vinyl acetate-maleic anhydride was the suspending agent. Such copolymers are usually produced in a non-aqueous system and contain equivalent amounts of vinyl ester and maleic anhydride.

An object of this invention is to provide a completely water-soluble synthetic resin. Another object is to provide a method of producing the water-soluble resin in an aqueous polymerization system.

These and other objects are attained by polymerizing in an aqueous medium, 10 mols of a vinyl ester and adding to the polymerization system in a continuous or semi-continuous manner, 0.25 to 1.0 mol of a monoalkyl ester of maleic acid reacted with an alkaline material. The heteropolymer produced by this process is believed to have the following configuration, in which "A" represents vinyl ester units and "B" represents the salt of the monoalkyl maleate:

—A—A—A—B—A—A—A—A—B—A—A—A—

The water solubility of the product is believed to be due to the random distribution of maleate units throughout the polyvinyl ester polymer chain.

The water solubility of the product appears to depend at least partially upon the extent to which alkaline materials have been reacted with the unesterified carboxyl group in the monoalkyl ester of maleic acid. Because this water-soluble resin is made in an aqueous medium it is usually preferred to react only a part of the carboxyl groups with an alkaline material prior to or during the copolymerization and to neutralize the resin further after it has formed or when it is to be used.

In order that this invention may be fully understood, the following examples show how these resins are produced. It is to be understood that the invention is not limited to the specific nature of the examples. Where the term 'parts' is used, it signifies parts by weight.

Example I 6.6 parts of monoisopropyl maleate was reacted with 0.52 part of concentrated (58%) ammonium hydroxide and 10% of the reaction product was charged into a polymerization kettle along with 93 parts of vinyl acetate, 100 parts of water and 1.8 parts of benzoyl peroxide.

The temperature of the mixture was raised to 75° C. The mixture was agitated and kept between 70° C. and 80° C. for 150 minutes during which time the remaining 90% of the ammonium monoisopropyl maleate was slowly added.

The resin product was in the form of very large spherical beads even though no suspending agent was used in the process. The beads were separated from the water layout and dried in air at 50° C. The resin was soluble in benzene and ethyl alcohol.

When the product was further reacted with 1.2 parts of concentrated (58%) ammonium hydroxide, it dissolved in water to give a clear solution.

The water solution can be cast on surfaces to give a clear film which can be made water-insensitive by heating over 100° C. for 30 minutes.

Example II

This example is the same as Example I except that the butyl monoester of maleic acid was used. The product was similar to that in Example I in that when further reacted with sodium hydroxide or ammonium hydroxide, it was soluble in water. 88 g. of the product in 1000 cc. of benzene had a viscosity of 12.2 cp. at 20° C. The copolymer was soluble in dioxane, methanol, ethanol, acetone and mixtures of toluene and methanol.

The properties exhibited by this copolymer are not obtainable when maleic anhydride salts are used in place of the salt of the monoester of maleic acid.

Example III

The following shows a system in which 0.3 mol of a maleic anhydride salt was reacted with 10 mols of vinyl acetate.

Charge:
   100    parts water
     1.8 parts benzoyl peroxide
    98.0 parts vinyl acetate monomer 90% of the reaction product of 3.3 parts of maleic anhydride and 0.66 part of concentrated ammonium hydroxide in 12% of the water was added slowly throughout the reaction. The other 10% was added in the original charge. The same equipment and conditions were used as in Example I.

The product was separated from the aqueous phase and dried in air at 50° C. The fine copolymer beads were only swollen in 0.1N solution of alkalies. This example emphasizes that a small amount of the salts of the half esters of maleic acid have the property of copolymerizing more or less homogeneously with a large amount of a vinyl ester. Maleic acid and its salts will not do this. In contrast to the configuration given above, a small amount of maleic acid with a large amount of a vinyl ester is believed to polymerize in the following way. "A" represents the vinyl ester units and "C" represents maleic acid groups or salts:

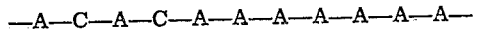

The process of this invention is applicable to vinyl esters. Particularly valuable and unexpected results are obtained however when vinyl esters of lower aliphatic acids containing 2-6 carbon atoms are used as the major co-monomer. Examples of these vinyl esters are vinyl acetate, vinyl propionate, vinyl butyrate, vinyl valerate, vinyl hexoate, and mixtures thereof.

Maleic acid is only one of a large number of ethylene dicarboxylic acids. The properties of the maleate monomers are outstanding in this process and product. Mesaconic esters, citraconic esters and others may be used but the resins formed are not so soluble as the maleate copolymers.

The monoalkyl ester of maleic acid may be prepared by any of the well-known methods. The alkyl group may be methyl, ethyl, propyl, isopropyl, butyl, isobutyl, tertiary butyl, amyl, hexyl, cyclohexyl, heptyl or any alkyl group containing between 1-10 carbon atoms. Unsaturated groups are not very suitable because they enter into the addition polymerization reaction.

As pointed out above, the water solubility of the product also is dependent upon the extent to which the monoalkyl ester has been neutralized with an alkaline material. The examples show one method of making the copolymers. It may be done, however, in one step if a solution is required and it is not necessary to isolate the resin. If more than 50% of the monoalkyl maleate ester has been neutralized, the copolymers dissolve in the reaction medium as it is formed. The concentration of the copolymers in the reaction medium is best kept below 35% to avoid gel formation. These copolymers have the exceptional property of forming very fluid solutions. Extremely low viscosity aqueous solutions of these resins can be made containing up to 20-30% concentrations depending upon temperature, the maleate co-monomer, etc. Between 25% and 35% concentrations, stiff gels are formed.

Copolymers made from ammonium alkyl maleates and vinyl esters can be made water resistant by heating. The same result is obtained with resins which contain sodium or potassium salts by treatment with multivalent metal compounds such as alum or barium hydroxide.

This product may be made in any of the conventional equipment commonly used for polymerization reactions if it is fitted with some means for slowly adding the salt of the monoalkyl maleate. To produce a water-soluble product, it is not necessary that this co-monomer be added continuously or with exact regularity so long as no more than 0.15 mol of the co-monomer is present in the momomeric state during the polymerization of 10 mols of the vinyl ester. The addition of some or the major part of the vinyl ester into the reaction may be delayed, keeping in mind that the ratio above stated should not be exceeded.

The temperature at which the reaction is carried out is not critical; any convenient temperature may be used. Reflux temperature is suitable for most combinations of monomers. The copolymerization reaction may be carried out under superatmospheric pressure. Pressure equipment is necessary when the reaction is run at temperatures above the boiling point of the monomers.

Various water-soluble and oil-soluble, high and low temperature polymerization catalysts may be used in place of the peroxides utilized in the examples. Oil-soluble catalyst seem better adapted to processes in which the beads are produced first and the product is later reacted further with an alkaline material. Water-soluble catalysts are most suitable when a water solution of the copolymer is made in one step. Examples of suitable catalysts are peracetic acid, sodium perborate, sodium persulfate, potassium persulfate, sodium peroxide, hydrogen peroxide, urea peroxide, ethyl percarbonate, benzoyl peroxide, lauryl peroxide, ditertiary butyl peroxide, oleyl peroxide, acetyl peroxide, and the like. In certain cases, the action of light may also be helpful in expediting the action of the catalysts mentioned above.

The amount of catalyst or combination of catalysts may be substantially varied, depending upon the speed of reaction desired, the viscosity desired in the copolymer and the reaction temperature. In general, small amounts are sufficient and usually an amount is used which will provide 0.0005 to 0.2 part of available oxygen for every 100 parts of the monomeric compounds to be copolymerized. All of the catalyst or catalysts may be added at the start or in a continuous or semi-continuous manner throughout the reaction.

Other substances may be added to change or control the pH of the reaction medium, to assist the action of the catalyst or to limit the viscosity of the copolymer. Examples of these modifiers are formic acid, sodium bicarbonate, acetic acid, toluene, methyl ethyl ketone, acetaldehyde, iron salts, etc.

The copolymerization time is dependent upon a number of factors and is generally not critical. Increasing the amount of catalyst, increasing the temperature or increasing the pressure will reduce the time necessary for copolymerization. These variables can be adjusted so as to give any convenient reaction time.

The advantages flowing from the use of this invention are quite evident. It provides new water-soluble resins and a simple economical process for their manufacture. The copolymers are made in an aqueous system in the pure state because none of the surface active agents commonly associated with suspension polymerization systems need be used here.

The copolymers find their greatest use in the surface coating and adhesive fields.

It is to be understood that the invention is not limited to the specific embodiments shown above except as defined by the appended claims.

What is claimed is:

1. A polymerization process which comprises reacting together in an aqueous medium and in the presence of a polymerization catalyst, 10 mols of a vinyl ester of an aliphatic acid containing 2-6 carbon atoms and 0.25 to 1.0 mol of a monoalkyl ester of maleic acid reacted with an alkaline reacting material taken from the group consisting of ammonium and alkali metal compounds, the salt of the monoalkyl maleate acid being introduced into the aqueous medium containing the vinyl ester at such a rate that not over about 0.15 mol of unreacted monoalkyl maleate salt is present at any time throughout the polymerization.

2. A polymerization process which comprises reacting together in an aqueous medium and in the presence of a polymerization catalyst, 10 mols of vinyl acetate and 0.25 to 1.0 mol of a monoalkyl ester of maleic acid reacted with an alkaline reacting material taken from the group consisting of ammonium and alkali metal compounds, the salt of the monoalkyl maleate being introduced into the aqueous medium containing the vinyl acetate at such a rate that not over about 0.15 mol of unreacted monoalkyl maleate salt is present at any time throughout the polymerization.

3. A process according to claim 2 in which the alkyl group of the monoalkyl ester contains 1-10 carbon atoms.

4. A process according to claim 2 in which less than 1.0 mol of the alkaline material has been reacted with 2.0 mols of the monoalkyl ester of maleic acid.

5. A process according to claim 2 in which more than 1.0 mol of the alkaline material has been reacted with 2.0 mols of the monoalkyl ester of maleic acid.

6. A process according to claim 2 in which the monoalkyl maleate is monoisopropyl maleate.

7. A process according to claim 2 in which the monoalkyl maleate is monobutyl maleate.

8. A polymerization process which comprises reacting together in an aqueous medium and in the presence of a polymerization catalyst, 10 mols of vinyl acetate with 0.25-1 mol of monobutyl ammonium maleate, the maleate salt being introduced into the aqueous medium containing the vinyl acetate at such a rate that not over 0.15 mol of the unreacted salt is present at any time throughout the polymerization.

9. A copolymer of 10 mols of vinyl acetate and 0.25-1 mol of a monoalkyl ester of maleic acid reacted with an alkaline reacting material selected from the group consisting of ammonium and alkali metal compounds, made according to the process as defined in claim 2.

WILFRED K. WILSON.

No references cited.